US010270836B2

United States Patent
Lee et al.

(10) Patent No.: US 10,270,836 B2
(45) Date of Patent: Apr. 23, 2019

(54) METHOD AND APPARATUS FOR PROVIDING WEB SERVICES

(71) Applicant: Samsung Electronics Co., Ltd., Suwon-si, Gyeonggi-do (KR)

(72) Inventors: Hyewon Lee, Seoul (KR); Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 15/061,491

(22) Filed: Mar. 4, 2016

(65) Prior Publication Data

US 2016/0269467 A1 Sep. 15, 2016

(30) Foreign Application Priority Data

Mar. 9, 2015 (KR) .................. 10-2015-0032717

(51) Int. Cl.
*G06F 15/16* (2006.01)
*H04L 29/08* (2006.01)
(Continued)

(52) U.S. Cl.
CPC .......... *H04L 67/02* (2013.01); *H04L 61/2007* (2013.01); *H04L 61/6013* (2013.01);
(Continued)

(58) Field of Classification Search
CPC .. H04L 67/02; H04L 61/2007; H04L 61/6013
(Continued)

(56) References Cited

U.S. PATENT DOCUMENTS

2004/0077337 A1\* 4/2004 Vestergaard ............ H04L 29/06
455/414.1
2005/0138604 A1 6/2005 Harrison
(Continued)

FOREIGN PATENT DOCUMENTS

KR 10-1373863 B1 3/2014
WO 2013/190545 A1 12/2013

OTHER PUBLICATIONS

Narlikar G. et al.; "Tabla: A client-Based Scheduling Algorithm for Web Proxy Clusters"; Conference Proceesings of the 2001 IEEE international performance; Computing, and Communications Conference. (IPCCC); Phoenix, AZ; Apr. 4-6, 2001; pp. 217-227; XP001049955.

*Primary Examiner* — Philip B Tran
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method and apparatus provide information on traffic of a user equipment in a mobile communication system to an operator's network or to a third server. An operator can operate a proxy and may inspect and control a hypertext transfer protocol over secured layer (HTTPS) traffic through the proxy to collect HTTPS traffic relevant information.

19 Claims, 9 Drawing Sheets

(51) Int. Cl.
*H04L 29/12* (2006.01)
*H04W 4/70* (2018.01)
*H04W 12/02* (2009.01)
*H04W 88/18* (2009.01)

(52) U.S. Cl.
CPC .............. *H04W 4/70* (2018.02); *H04W 12/02* (2013.01); *H04W 88/182* (2013.01)

(58) Field of Classification Search
USPC .......................................... 709/217–218, 203
See application file for complete search history.

(56) References Cited

U.S. PATENT DOCUMENTS

| | | |
|---|---|---|
| 2006/0031394 A1 | 2/2006 | Tazuma |
| 2008/0167018 A1* | 7/2008 | Havlark ................. H04W 4/02 455/414.2 |
| 2014/0122580 A1 | 5/2014 | Nuaimi et al. |
| 2014/0206396 A1 | 7/2014 | Thomas et al. |
| 2015/0016418 A1* | 1/2015 | Thiebaut ............. H04L 63/0892 370/331 |
| 2015/0109995 A1* | 4/2015 | Mathai ................ H04L 61/1511 370/328 |
| 2015/0257178 A1* | 9/2015 | Huang-Fu ............. H04L 65/104 455/450 |

* cited by examiner

METHOD AND APPARATUS FOR PROVIDING WEB SERVICES

CROSS-REFERENCE TO RELATED APPLICATION(S)

This application claims the benefit under 35 U.S.C. § 119(a) of a Korean patent application filed on Mar. 9, 2015 in the Korean Intellectual Property Office and assigned Serial number 10-2015-0032717, the entire disclosure of which is hereby incorporated by reference.

TECHNICAL FIELD

The present disclosure relates to a method and an apparatus for providing web services. More particularly, the present disclosure relates to a method and an apparatus for providing, by Internet operators, web services on the basis of traffic requests received from users.

BACKGROUND

To meet the demand for wireless data traffic, having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm Wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna techniques, and analog beam forming, large scale antenna techniques, are discussed in 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and frequency and quadrature amplitude (QAM) modulation (FQAM) and sliding window superposition coding (SWSC) as an advanced coding modulation (ACM), filter bank multi-carrier (FBMC), non-orthogonal multiple access (NOMA), and sparse code multiple access (SCMA) as an advanced access technology, have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and big data processing technology through connection with a cloud server, has emerged. As technology elements, such as "sensing technology", "wired/wireless communication and network infrastructure", "service interface technology", and "Security technology" have been demanded for IoT implementation, a sensor network, machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including those associated with a smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as sensor networks, MTC, and M2M communications may be implemented by beamforming, MIMO, and array antennas. Application of a cloud RAN as the above-described big data processing technology may also be considered as an example of convergence between the 5G technology and the IoT technology.

With the development of mobile communication technologies, various technologies of providing Internet communication using a user equipment have been developed. For the Internet communication, a communication method of using a hypertext transfer protocol (HTT) and a proxy has been mainly used. The HTTP is an application layer protocol which may transmit and receive information on the Internet and is mainly used to transmit and receive an HTML document. The HTTP is a transport layer protocol and uses a transport control protocol (TCP) or a user data protocol (UDP). The HTTP is a request/response based protocol that is made between a client and a server. For example, if a client or a web browser such as an application program, application function (AF), or interface that may parse information provided from a web browser (world wide web (WWW) to allow users to see the information, requests a web page or picture information from a server through the HTTP, the server responds to the request to transmit necessary information to the corresponding user. Hereinafter, 'browser' is used as an alternative term to 'web browser' or 'client'. The user sees the information through an output device such as a monitor.

A proxy server is a function or program to allow the client to indirectly access other network services for himself/herself. A repeater between the server and the client is referred to as a proxy performing communication by proxy, and an apparatus performing a repeating function is referred to as a proxy server. The proxy server stores contents that any client requests from the server before a specific point of time in a cache, and responds to the information in the cache by proxy on behalf of the server when information that the same client or other clients request after the corresponding point of time is present in the cache. Due to the use of the proxy, there is no need to access the server to bring data. As a result, the transmission time may be saved and the unnecessary traffic request may be reduced, thereby improving communication efficiency.

In the communication using the HTTP and the proxy, a network operator may provide various services such as user information on a client and information on the server requesting the HTTP, interception of harmful information based on contents of HTTP traffic, provision of relevant additional information/advertisement, and control of contents access right. However, by using a hypertext transfer protocol over secured layer (HTTPS) protocol and the like, that is the application layer protocol of which the security is enhanced by encryption of the HTTP traffic in recent years, an intermediate entity other than the server/client increasingly handles the traffic (hereinafter, security traffic) of which the contents may not be understood. Therefore, the network operator may have trouble inspecting or controlling the security traffic between the server/client.

The HTTPS additionally uses a secure sockets layer (SSL) protocol or a transport layer security (TLS) protocol to encrypt session data in addition to a TCP transport layer protocol, thereby further securing protection of data. The existing HTTPS has been mainly used in e-commerce and the like, for protection of financial transaction information. In recent years, however, the HTTPS is being used more often in messenger services, social network services and the like, for personal information protection, and as a result, a use ratio of HTTPS traffic has increased. To cope with this problem, a method for inspecting and controlling, by a network operator, security traffic is required.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide an improved method and apparatus for providing web services.

Another aspect of the present disclosure is to provide a method and an apparatus for providing web services based on contents of traffic or statistical information on traffic that is transmitted and received between a user (that is, a client or user equipment that is being driven by the client) and a server.

Another aspect of the present disclosure is to provide a user equipment and a method for operating the same to allow a network operator to provide web services. In accordance with an aspect of the present disclosure, a communication method of a user equipment is provided. The communication method includes transmitting a message requesting information on a proxy (hereinafter, referred to as an 'operator proxy') directly operated by an operator or operated by a third operator making an agreement with an operator to share traffic information to a specific network entity (hereinafter, referred to as an 'operator's network entity) present in an operator's network, receiving the operator proxy information from the network entity, setting a proxy to be used by a browser of the user equipment based on the proxy information, and redirecting traffic transmitted and received by the browser to the set operator proxy.

In accordance with an aspect of the present disclosure, a method of a user equipment is provided. The method includes obtaining proxy information related to a browser, setting a proxy related to a browser based on proxy information, and transmitting a traffic related to the browser through the proxy. In accordance with another aspect of the present disclosure, a user equipment is provided. The user equipment includes a transceiver configured to transmit and receive a signal, and a controller configured to request operator proxy information from an operator's network entity, receive the operator proxy information from the operator's network entity, set a proxy for a browser of the user equipment based on the operator proxy information, and redirect traffic transmitted and received by the browser to the set proxy.

In accordance with another aspect of the present disclosure, a user equipment is provided. The user equipment includes a transceiver configured to transmit and receive a signal, and a controller configured to obtain proxy information related to a browser, to set a proxy related to a browser based on the proxy information, and to transmit a traffic related to the browser through the proxy.

In accordance with another aspect of the present disclosure, an operator's network entity is provided. The operator's network entity includes a transceiver configured to transmit and receive a signal, and a controller configured to receive a message requesting proxy information from a user equipment, determine a proxy for the user equipment based on the message, and transmit the proxy information to the user equipment based on the determination. The proxy information may be set to redirect traffic transmitted and received by a specific browser of the user equipment to the operator proxy.

In accordance with another aspect of the present disclosure, a method for operating a network entity is provided. The method includes receiving a message requesting proxy information related to a browser from a user equipment, determining a proxy for the user equipment based on the message, and transmitting the proxy information related to the browser to the user equipment based on the determination, wherein the proxy information is used to set a proxy related to the browser, and a traffic related to the browser is transmitted through the set proxy.

In accordance with another aspect of the present disclosure, a network entity is provided. The network entity includes a transceiver configured to transmit and receive a signal, and a controller configured to receive a message requesting proxy information related to a browser from a user equipment, to determine a proxy for the user equipment based on the message, and to transmit the proxy information related to the browser to the user equipment based on the determination, wherein the proxy information is used to set a proxy related to the browser, and a traffic related to the browser is transmitted through the set proxy.

In accordance with another aspect of the present disclosure, an operator's network entity is provided. The operator's network entity includes a transceiver configured to transmit and receive a signal, and a controller configured to receive a message requesting operator proxy information from a user equipment, determine an operator proxy for the user equipment based on the message, and transmit the operator proxy information to the user equipment based on the determination. The proxy information may be set to redirect traffic transmitted and received by a specific browser of the user equipment to the operator proxy.

In accordance with another aspect of the present disclosure, a method for operating a user equipment is provided. The method includes transmitting a traffic request message regardless of whether using an operator proxy and a general proxy, and transmitting a traffic request message, receiving a traffic response message, generating a packet including traffic metadata for at least one of the traffic request message or the traffic response message, and transmitting the generated message to an operator's network entity.

In accordance with another aspect of the present disclosure, a user equipment is provided. The user equipment includes a transceiver configured to transmit and receive a signal regardless of whether using an operator proxy and a general proxy, and a controller configured to transmit a traffic request message, receive a traffic response message, generate a packet including traffic metadata for at least one of the traffic request message or the traffic response message, and transmit the generated message to an operator's network entity.

In accordance with another aspect of the present disclosure, a method for operating a network entity is provided. The method includes processing a traffic request message or a traffic response message of a user equipment through an operator's network, receiving a message from the user equipment, determining whether the message type is a general request message and a message including metadata for the general traffic message or a traffic response message, and processing the message based on the message type.

In accordance with another aspect of the present disclosure, an operator's network entity is provided. The operator's network entity includes a transceiver configured to transmit and receive a signal, and a controller configured to process a traffic request message or a traffic response message of a user equipment through an operator's network, receive the message from the user equipment, determine whether the message type is a general request message and a message including metadata for the general traffic message or a traffic response message, and process the message based on the message type.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In accordance with the embodiment of the present disclosure, a proxy and a proxy server are used as an alternative term to each other. In accordance with the embodiment of the present disclosure, unless a server is basically called a server of a network operator, the server is assumed to be a third server, and not the server of the network operator.

Hereinafter, an 'operator' is referred to as a 'network operator' unless specified otherwise. An 'operator proxy' is referred to as a proxy that is directly operated by an operator or operated by a third operator who makes an agreement with the operator.

Figure 1:
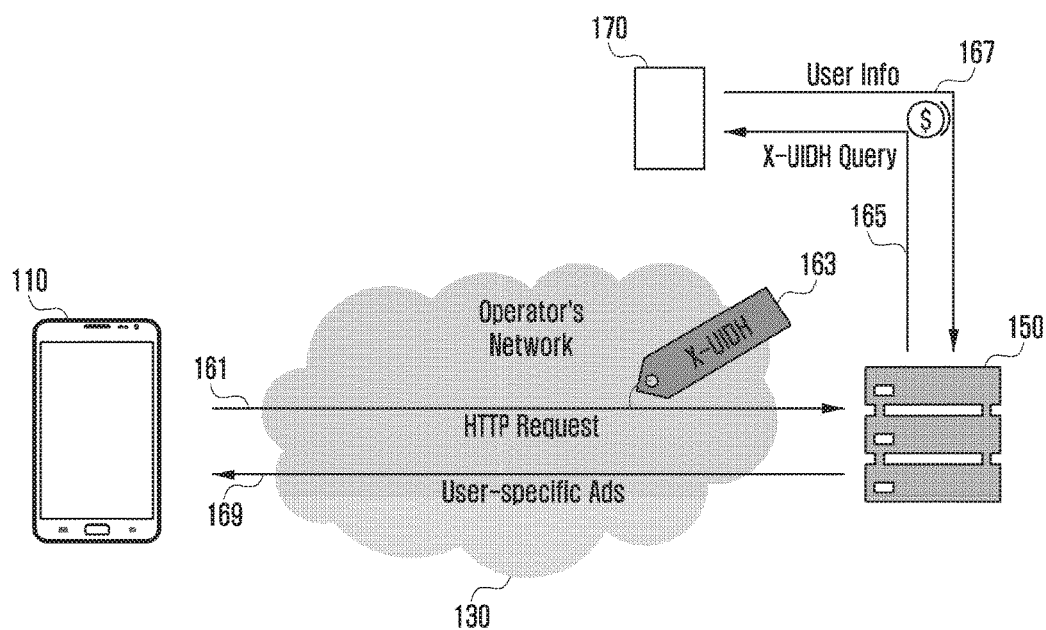
FIG. 1 is a diagram illustrating a method of network management of a network operator according to an embodiment of the present disclosure.

FIG. 1 is a diagram illustrating a method of network management of a network operator according to an embodiment of the present disclosure.

Referring to FIG. 1, a network system includes a user equipment 110, an operator's network 130, and a server 150. The user equipment 110 may request traffic from the server 150 and receive the traffic from the server 150. The operator's network 130 may transmit the traffic between the user equipment 110 and the server 150. Further, services may be provided by using information on the traffic transmitted between the user equipment 110 and the server 150. At least in this case, the service may be a web service, but embodiments are not limited thereto.

In operation 161, the user equipment 110 requests traffic from the server 150. The traffic request may be a hypertext transfer protocol (HTTP) request. The traffic requested by the user equipment 110 may be transmitted to the server 150 via the operator's network 130.

In operation 161, the operator's network 130 receiving the traffic request from the user equipment 110 may transmit the traffic request to the server 150. The operator's network 130 may parse the traffic request received from the user equipment 110 to provide the web service. For example, the operator's network 130 may add an identifier or other identification 163 to the traffic that is generated and transmitted by the user equipment 110, and transmit it to the server 150. The identifier 163 may use a unique identifier header (X-UIDH) tag. Since the identifier 163 is added by the operator's network 130, the operator's network 130 may determine the information on the user equipment 110 corresponding to the identifier 163. However, the server 150 is not able to fully identify the information on the user equipment 110 by only the traffic received via the operator's network 130.

Therefore, in operation 165, the server 150 requests information on the user equipment 110 corresponding to the identifier 163 from an operator's network entity 170.

In operation 167, the operator's network entity 170 may provide the information on the user equipment 110 to the server 150. The information on the user equipment 110 may include information on a user equipment device and information on a user of the user equipment. For example, the information on the user equipment 110 may include information such as sex information, age information, location information, and web access history of a user. The operator may also use operations 165 and 167 as a profit model for providing the user information on the user equipment. In this case, there may be a problem in providing personal information depending on whether a user agrees with the provision of the user information on the user equipment 110.

In operation 169, the server 150 may use the information on the user equipment 110 received from the operator's network entity 170 to provide additional information to the user equipment 110. For example, the server 150 may transmit advertisement information corresponding to the identifier 163 of the user equipment 110.

The embodiment of FIG. 1 may be applied to the HTTP traffic, but may also be applied or not to the secured traffic like the hypertext transfer protocol over secured layer (HTTPS) traffic.

Figure 2:
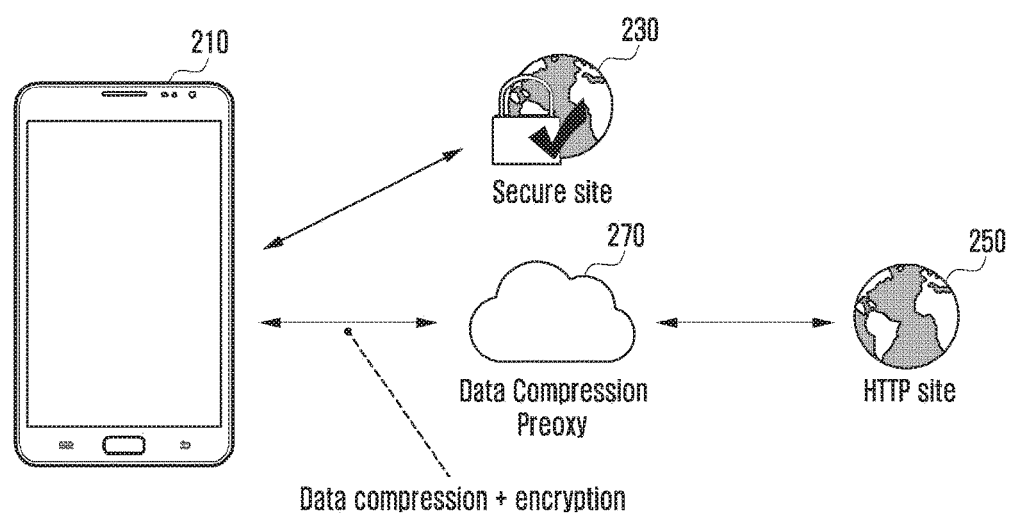
FIG. 2 is a diagram illustrating a method of services using a proxy according to an embodiment of the present disclosure.

FIG. 2 is a diagram illustrating a method of services using a proxy according to an embodiment of the present disclosure.

Referring to FIG. 2, the case in which a user equipment 210 uses a specific browser to access a web site is assumed. The web site includes a secured web site 230 and/or a general web site 250. The web site may further include a proxy 270 corresponding to the browser. That is, the proxy 270 may be a proxy server of a program provider that provides the browser.

The specific browser may provide a security function. For example, when the security function is used, the user equipment 210 may compress and encrypt data of all the traffic transmitted and received between the specific browser and the general web site 250, and transmit the compressed and encrypted data through the proxy 270. In this case, when the operator's network for the user equipment is present between the user equipment 210 and the proxy 270, the operator may not directly use the traffic. That is, in accordance with the embodiment of FIG. 2, since the traffic transmitted and received by the specific browser of the user equipment is compressed and encrypted in a form in which it may not be recognized by the operator's network, the operator's network may not inspect the traffic transmitted from the user equipment 210 or may not collect information (for example, detailed information on contents included in the corresponding traffic, and the like) on the corresponding traffic and may simply serve as a gateway through which the traffic is transmitted.

The following embodiment of the present disclosure provides a method and an apparatus for supporting a function set to allow the user equipment to use an operator proxy to the user equipment. Further, the following embodiment of the present disclosure provides a method and an apparatus for operating a system to allow a network operator to confirm contents of an HTTP or HTTPS traffic.

An embodiment in which the operator proxy is set to be used by the user equipment will now be described. In accordance with the present embodiment, the network operator includes at least one operator proxy. The user equipment may include a function of allowing the browser set in the user equipment to search for the operator proxy. In one embodiment, the user equipment may search for the operator proxy using a modem in the user equipment.

The specific browser of the user equipment may search for the operator proxy of the network operator providing wireless communication services to the user equipment, and may be set to transmit and receive the HTTP or the HTTPS traffic based on the searched proxy. The function of searching for the operator proxy or operator proxy information corresponding to the specific operator may be set in the user equipment in advance. For example, if the user equipment receives wireless communication services from a first network operator, the user equipment searches for a first operator proxy server corresponding to the first network operator. If the user equipment receives wireless communication services from a second network operator, the user equipment searches for a second operator proxy server corresponding to the second network operator. A detailed search method will be described with reference to FIGS. 3 and 4.

In a roaming scenario, the user equipment may set different operator proxies depending on a home network and a visitor network. Further, in accordance with the embodiment of the present disclosure, different operator proxies may be set depending on a kind of traffic, location information of the user equipment, or an access point name (APN). In this case, the operator's network may include a plurality of operator proxies and the user equipment may search for a specific operator proxy among the plurality of operator proxies depending on the kind of traffic, the location information of the user equipment, or the APN, and set the searched specific operator proxy.

Figure 3:
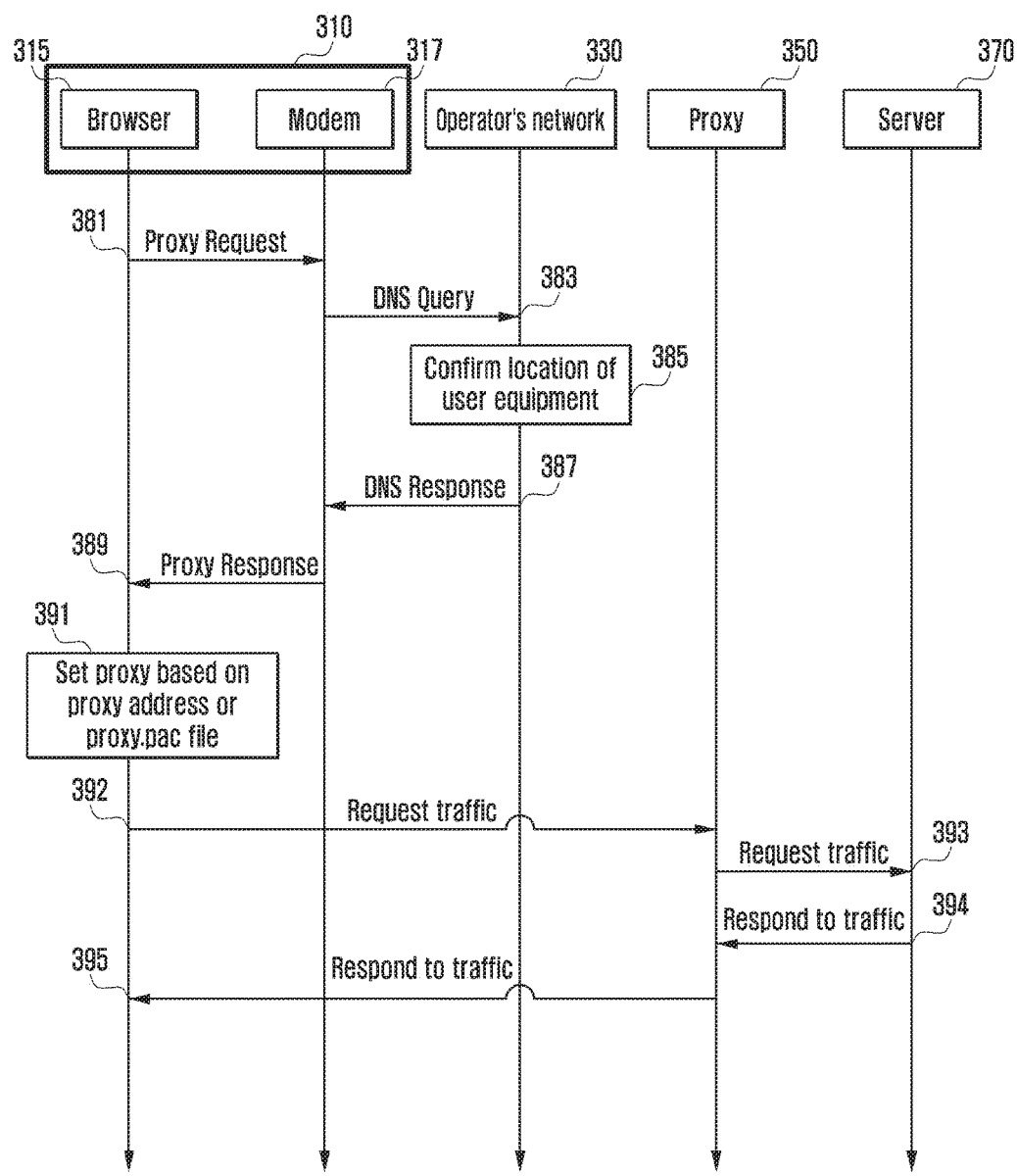
FIG. 3 is a diagram illustrating a method for setting an operator proxy according to an embodiment of the present disclosure.

FIG. 3 is a diagram illustrating a method for setting an operator proxy according to an embodiment of the present disclosure.

Referring to FIG. 3, a wireless communication system includes a user equipment 310, an operator's network 330, an operator proxy 350, and a server 370. The user equipment 310 may include a browser 315 and a modem 317. The operator's network 330 includes, but is not limited to, a specific operator entity for performing the functions of the embodiment in the operator's network.

Figure 4:
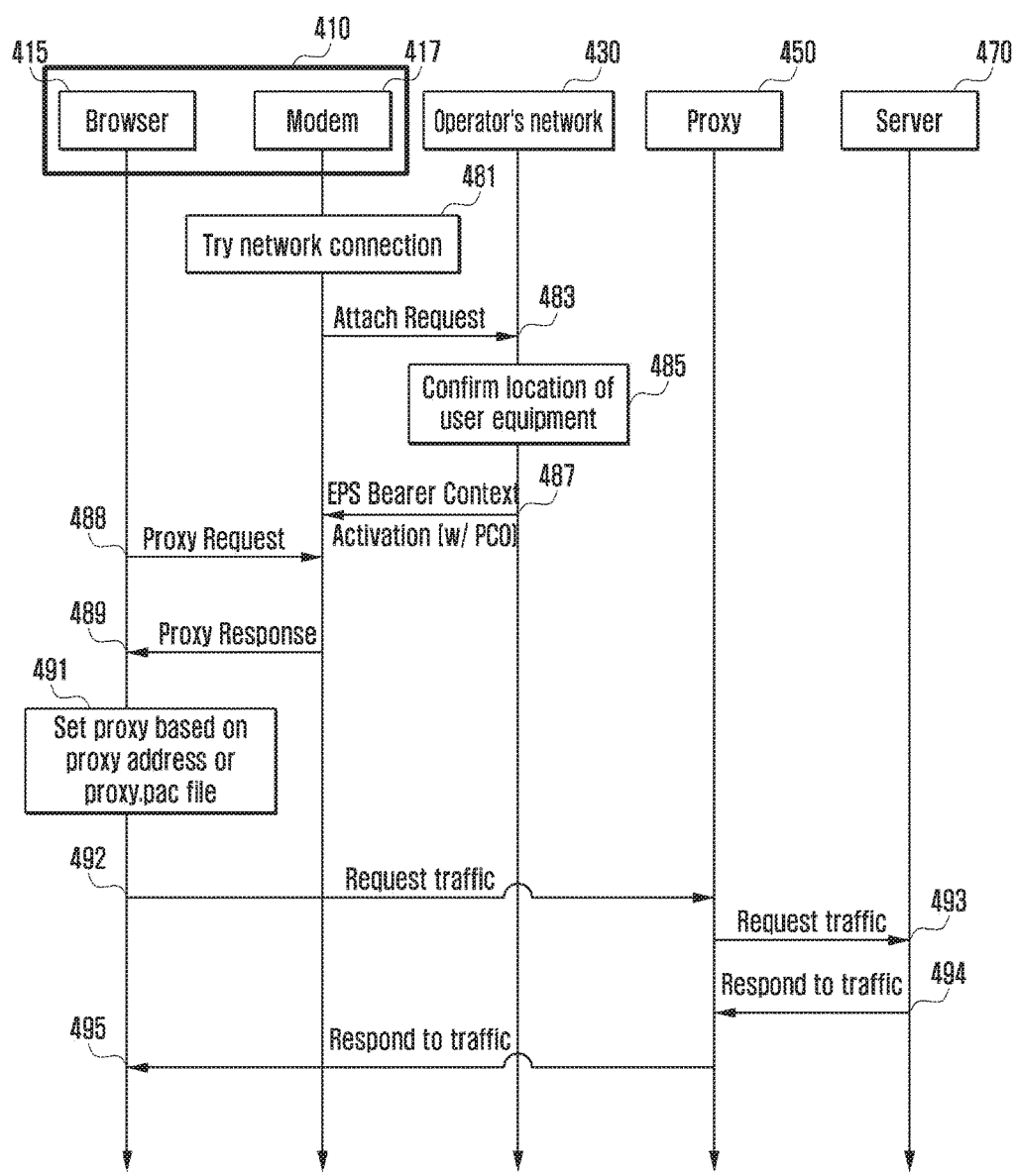
FIG. 4 is a diagram illustrating a method for setting an operator proxy according to an embodiment of the present disclosure.

In operation 381, the browser 315 may transmit a proxy information request message to the modem 317. In this case, the browser 315 may instruct the modem 317 whether to use a domain name system (DNS) or a protocol configuration option (PCO). FIG. 3 illustrates a method for setting a network operator proxy using DNS, and FIG. 4 illustrates a method for setting a network operator proxy using PCO. The network operator proxy information includes address information on the proxy operated by the network operator. In this case, the user equipment 310 may request the proxy information corresponding to the browser 315. That is, the user equipment 310 may use a plurality of browsers. If operation 391 has been previously completed, when the browser 315 among the plurality of browsers requests and receives the web traffic, the browser 315 uses the network operator proxy 350.

In operation 383, the user equipment 310 uses the DNS to request operator proxy information from the operator's network 330. In this case, the user equipment 310 may use a DNS query. The user equipment 310 transmits the DNS query to a specific domain of the operator's network 330. In this case, the DNS query requesting the operator proxy information may include public land mobile network (PLMN) identification information and/or the APN and/or the location information of the user equipment.

The specific information may be set as the following rule (1), but embodiments are not limited thereto.

PLMN_ID.APN.proxy.com　　　　　　　　　　(1)

For example, the specific information may be set and used as the following rules (2) and (3).

skt.internet.proxy.com　　　　　　　　　　(2)

kt.rcs.proxy.com　　　　　　　　　　(3)

In operation 385, the operator's network 330 may identify location information of the user equipment 310. When the location information is stored in advance, operation 385 may be omitted. Further, when the operator's network 330 does not consider the location information upon the provision of the operator proxy information, operation 385 may be omitted.

In operation 387, the operator's network 330 may select the operator proxy for the user equipment 310. The operator's network 330 may use at least one of the PLMN identification information, the APN, and the location information to select a single operator proxy for the user equipment or an operator proxy list. The operator's network 330 may transmit a proxy information response message based on a proxy information request message received from the user equipment 310. The proxy information response message may be the DNS response message.

A proxy information response message includes the operator proxy information. The operator proxy information may include the selected single operator proxy or the operator proxy list. The operator proxy information may be the location information of at least one selected operator proxy or location information of at least one proxy auto configuration (PAC) file. The location information of the operator proxy or the location information of the proxy PAC file may be a form of an internet protocol (IP) address or a universal resource location (URL). The proxy PAC file may include more than one operator proxy use rule.

The user equipment 310 may then store the operator proxy information.

In operation 389, the modem 317 transmits the received operator proxy information to the browser 315. In operation 391, the browser 315 sets the operator proxy for the browser 315 of the user equipment 310 based on the operator proxy information included in the proxy response message 387. That is, operations 389 and 391 are operations of setting, by the user equipment 310, the operator proxy based on the operator proxy information received from the operator's network 330. If the operator proxy for the browser 315 is set, the traffic request and the traffic response between the user equipment 310 using the browser 315 and the server 370 are performed by passing through the operator proxy 350 set in operation 391.

As an example, the case in which the user equipment 310 uses the browser 315 to transmit the traffic request to the server 370 will now be described.

In operation 392, the user equipment 310 transmits the traffic request message for the server 370. The user equipment 310 may use the browser 315 to transmit the traffic request message. The traffic request message may be an HTTP request message or an HTPPS request message. The operator proxy 350 is set in the user equipment 310 by operation 391. The traffic request message 392 is transmitted to the operator proxy 350. Since the traffic request message transmitted by the user equipment 310 is transmitted to the operator proxy 350 that is directly or indirectly operated by the operator, the network operator may acquire the information on the user equipment 310 transmitting the traffic request message or inspect the traffic request and response messages.

In operation 393, the operator proxy 350 may transmit the traffic request message to the server 370. The operator proxy 350 may provide the information on the user equipment 310 to the server 370 by the agreement between the network operator and the server operator and the like, if necessary. The information on the user equipment 310 may be transmitted simultaneously with transmitting the traffic request message or transmitted through a separate transmission path.

In operation 394, the server 370 may transmit the traffic response message corresponding to the traffic request message. The traffic response message may be transmitted to the user equipment 310 through the operator proxy 350. Further, the server 370 may provide the additional information on the user equipment 310 based on the information on the user equipment 310 received in operation 393. For example, the advertisement information may be provided based on the information on the user equipment or the information on the user of the user equipment. In operation 394, the proxy may store the traffic response message received from the server in a cache.

In operation 395, the operator proxy 350 may transmit the traffic response message to the user equipment 310. The user equipment 310 may confirm the traffic response message using the browser 315 and display contents of the message to the user of the user equipment.

FIG. 4 is a diagram illustrating a method for setting an operator proxy according to an embodiment of the present disclosure. The operations of FIG. 4 corresponding to similar operations of FIG. 3 will be described by referring to the detailed description of FIG. 3.

Referring to FIG. 4, a method for acquiring, by a user equipment 410, operator proxy information upon a first access to a network or at a specific point of time will be described. In FIG. 4, a method for acquiring operator proxy information based on PCO and setting an operator proxy using acquired information will be described. A wireless communication system of FIG. 4 includes the user equipment 410, an operator's network 430, an operator proxy 450, and a server 470. The user equipment 410 may include a browser 415 and a modem 417.

In operation 481, the user equipment 410 tries a network connection.

For example, the following description assumes the case in which the wireless communication is a long term evolution (LTE) system, but embodiments are not limited thereto.

In operation 483, the user equipment 410 transmits an access request message to the operator's network 430. The access request message may be an attach request message. The attach request message may include the location information of the user equipment. The user equipment 410 may use the access request message to request the operator proxy information to be set in the user equipment 410. For example, when using the specific browser 415, the user equipment 410 may request the operator proxy information to be used.

In operation 485, the operator's network 430 may identify the location information of the user equipment 410. When the location information is stored in advance, operation 485 may be omitted. Further, when the operator's network 430 does not consider the location information upon the selection of the operator proxy information, operation 485 may be omitted.

In operation 487, the operator's network 430 may select the operator proxy for the user equipment 410. The operator's network 430 may use at least one of the PLMN identification information, the APN, and the location information to select a single operator proxy for the user equipment or an operator proxy list. The operator's network 430 may transmit the operator proxy information to the user equipment 410.

In the LTE based communication, when the user equipment 410 first accesses the network or generates a new packet data network (PDN) connection, the network operator returns an EPS_BEARER_CONTEXT_ACTIVATION message. Therefore, the EPS_BEARER_CONTEXT_ACTIVATION message is used to transmit the operator proxy information. The operator's network 430 may add a PCO information element (PCO IE) including the operator proxy information to the corresponding message and transmit the message. The message transmitting the operator proxy information is not limited to the EPS_BEARER_CONTEXT_ACTIVATION message, and may also use other message formats (for example, EPS_BEARER_CONTEXT_MODIFICATION) or the message transmitting the operator proxy information may be included in a profile (for example, USIM CARD in case of LTE) for communication service for the user equipment.

The operator proxy information 487 may include the selected single operator proxy or the operator proxy list as in operation 387 of FIG. 3. The operator proxy information may be the location information of at least one selected operator proxy or the location information of at least one proxy PAC file. The location information of the operator proxy or the location information of the proxy PAC file may be a form of the IP address or the URL. The proxy PAC file may include more than one operator proxy use rule.

The user equipment 410 may then store the operator proxy information.

In operation 488, the specific browser 415 of the user equipment 410 is a modem 417, which may transmit the proxy information request message.

In operation 489, the modem 417 of the user equipment may use the operator proxy information stored as the result of operation 487 to transmit the proxy information response message. In operation 491, the browser 315 sets the operator proxy for the browser 415 of the user equipment 410 based on the proxy information response message. That is, operations 489 and 491 are operations of setting, by the user equipment 410, the operator proxy based on the operator proxy information received from the operator's network 430. If the operator proxy for the browser 415 is set, the traffic request and the traffic response between the user equipment 410 using the browser 415 and the server 470 are performed by passing through the operator proxy 450 set in operation 491.

Operations 492 to 495 of FIG. 4 correspond to operations 392 to 395 of FIG. 3. Therefore, operations 492, 493, 494 and 495 are described by referring to the description of the corresponding operations of FIG. 3.

By using the method illustrated in FIGS. 3 and 4, traffic may be set to pass through the operator proxy upon the traffic request. By this, the network operator may acquire the information on the user equipment transmitting the traffic and the traffic related information transmitted by the user equipment regardless of the encryption of the traffic (for example, HTTPS traffic). Further, it is possible to provide the web services (for example, user equipment and user customized advertisement, and the like) using the information. The method for setting of an operator proxy corresponding to a browser of the user equipment is not limited to one-time performance, and the user equipment may repeatedly perform the above process as needed to dynamically set the operator proxy.

An embodiment in which the user equipment provides the encrypted contents of the HTTPS traffic to the network operator will now be described. Hereinafter, the embodiment of sharing the encryption information and the embodiment of sharing the metadata will be separately described. However, this is for convenience of explanation and both embodiments may be applied or the specific operations of each embodiment may be applied to other embodiments.

An embodiment of sharing encryption information on security traffic will now be described. The present embodiment and the following embodiment assume HTTPS traffic is a representative example of the security traffic, but the contents of the present disclosure including the present embodiment and the following embodiment may be applied to HTTPS traffic, as well as all of the security traffic following an end-to-end security policy like the HTTPS. Therefore, the following 'HTTPS traffic' is to be construed as an alternative term to 'security traffic'.

The user equipment and the network operator may share the security information on the HTTPS traffic. For example, it is possible to share the security information on a transfer layer security protocol of the HTTPS traffic. A representative example of the security information may be the transport layer security (TLS) information. The TLS information may include an encryption key, an encryption algorithm, and the like, that are applied to the encryption of the HTTPS traffic. The security information may be the security information between the user equipment and the server (that is, a server of a third server operator, and not a server of a network operator). When the security information is information for the security between the user equipment and the server, the operator that is the intermediate entity may not know the security information and therefore, the encrypted HTTPS traffic between the user equipment and the server may not be decrypted or otherwise used. In accordance with the present embodiment, the user equipment may report the security information on the HTTPS traffic to the operator to allow the operator to decrypt the encrypted HTTPS traffic using the specific entity within the operator's network.

For this purpose, when the user equipment generates the connection of the HTTPS traffic to the web page of the server operated by the third server operator, the operator may be set to allow the user equipment to transmit the security information (for example, TLS information) of the HTTPS traffic to the operator. Further, the operator may request the user equipment to generate downlink traffic and uplink traffic as a separate session. For example, a connection between downlink HTTPS traffic and uplink HTTPS traffic may be generated separately. The operator may selectively request the security information on the connection between the downlink HTTPS traffic and the uplink HTTPS traffic from the user equipment under the agreement or consent with the third server operator and the user of the user equipment.

If the security information on the downlink HTTPS traffic and the uplink HTTPS traffic is selectively transmitted from the user equipment to the operator, the operator may decrypt only some of the HTTPS traffic under the agreement or consent with the third server operator and the user of the user equipment. For example, for the uplink HTTPS traffic from the user equipment toward the server, when the user permits the decryption of the HTTPS traffic under the consent with the user of the user equipment generating the traffic, the user equipment may provide the security information on the uplink HTTPS traffic to the operator and thus may be set to allow the operator to decrypt the traffic. Alternatively, for example, for the downlink HTTPS traffic from the server toward the user equipment, when the third server operator permits the decryption of the downlink HTTPS traffic under the consent with the third server operator generating the traffic, the user equipment provides the security information on the downlink HTTPS traffic to the operator and thus may be set to allow the operator to decrypt the traffic.

Figure 5:
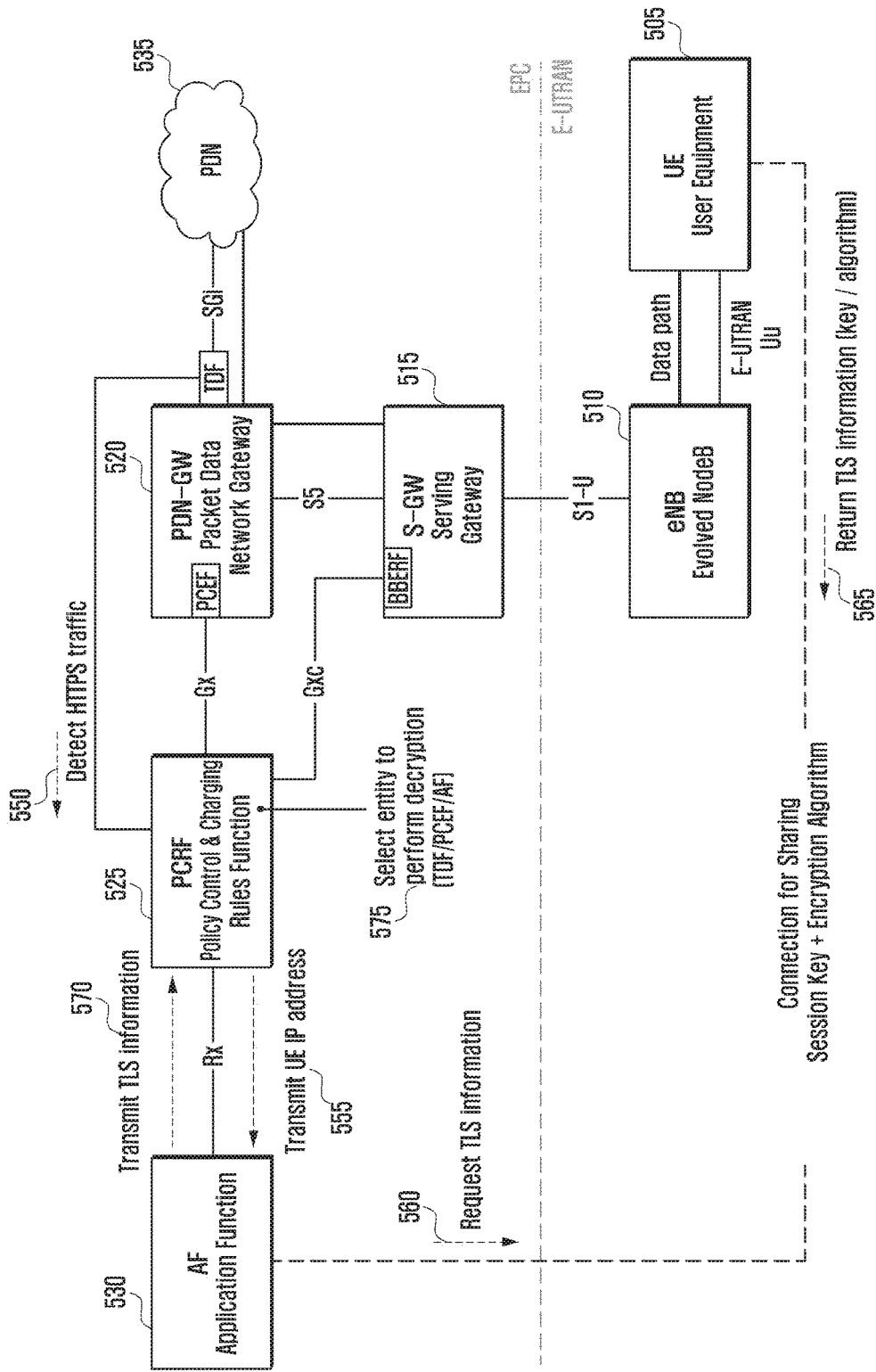
FIG. 5 is a diagram illustrating a method for sharing security information on hypertext transfer protocol over secured layer (HTTPS) traffic according to an embodiment of the present disclosure.

FIG. 5 is a diagram illustrating a method for sharing security information on HTTPS traffic according to an embodiment of the present disclosure.

Referring to FIG. 5, the mobile communication system is assumed to be an LTE communication system, but embodiments are not limited thereto. The mobile communication system includes a user equipment 505, a base station 510 (such as an evolved node B (eNB)), a serving gateway (S-GW) 515, a packet data network gateway (PDN-GW) 520, a policy and charging rules function (PCRF) 525, an AF 530, and a PDN 535.

The S-GW 515 becomes an end point of an evolved universal mobile telecommunications system terrestrial radio access network (E-UTRAN) and an evolved packet core (EPC). Upon a handover between the eNB and a $3^{rd}$ generation partnership project (3GPP) system, the S-GW 515 becomes an anchoring point.

The PDN-GW 520 connects the user equipment 505 to an external PDN network and provides a traffic or packet filtering function. The PDN-GW 520 allocates the IP address to the user equipment and is operated as a mobility anchoring point upon the handover between the 3GPPA and a non-3GPP. The PDN-GW 520 receives the policy and charging control (PCC) rules for the user traffic from the PCRF and performs a charging function depending on the traffic filtering per the user equipment and the traffic use on the basis of a policy and charging enforcement function (PCEF) generally implemented in the PDN-GW.

The PCRF 525 is a network entity that takes charge of the generation of the PCC rule and determines the traffic filtering policy to be applied to each user equipment, and determines a charging reference depending on the traffic used by the user equipment. The PCC rule generated in the PCRF is transmitted to the P-GW. Further, the PCRF 525 may become the center of the control for the information on the HTTPS traffic in the embodiment of the present disclosure.

The AF 530 may perform various roles according to the function arbitrarily set by the user. In accordance with the embodiment of the present disclosure, the AF 530 may acquire security information (for example, TLS information) on the HTTPS traffic based on the control of the PCRF 525, and transmit the acquired security information to the PCRF 525.

The PDN 535 is a data network based on a packet switching system. The LTE communication performs communication using the packet switching system with the eternal Internet network.

If the user equipment 505 requests the connection of the HTTPS traffic from the server of the third server operator within the PDN, the request is transmitted to the PDN-GW 520 via the base station 510 and the S-GW 520, and is transmitted to the server of the third server operator through the PDN after passing through the PCC rule of the PCEF from the PDN-GW.

In operation 550, a traffic detection function (TDF) of the PDN-GW 520 inspects the traffic passing through the PDN-GW and detects the traffic meeting the traffic detection rule received from the PCRF. The TDF may inform the PCRF 525 of the detection on the specific traffic. For example, the TDF may transmit a message to the PCRF 525, in which the message informs that the user equipment 505 requests the HTTPS traffic.

To correspond to the HTTPS traffic detection notification, in operation 555, the PCRF 525 may provide the information on the user equipment generating the HTTPS traffic to the AF 530. For example, the PCRF 525 may provide the IP address of the user equipment. The PCRF 525 may instruct the AF 530 to request the security information on the user equipment transmitting the HTTPS user equipment. When not using the AF 530, the PCRF 525 may omit operation 555 and directly request the security information on the user equipment (see operation 560). However, since the PCRF 525 performs various functions and a frequency of a high load operation is high, to reduce the load burden of the PCRF 525, the separate AF 530 may be used for managing the security information.

In operation 560, the AF 530 may transmit the security information request message to the user equipment 505. The security information is security information for decrypting the HTTPS traffic transmitted from the user equipment in the operator's network. For example, the security information may include the TLS information. The TLS information may include session key information and encryption algorithm information that are used for encryption. When not using the AF 530, the PCRF 525 may directly transmit the security information request message (see operation 560) to the user equipment.

In operation 565, the user equipment 505 may transmit the security information response message to the AF 530. The security information response message may include the security information (for example, TLS information) on the HTTPS traffic that the user equipment requests to connect. In operation 570, the AF 530 may transmit the received security information from the user equipment 505 to the PCRF 525. When not using the AF 530, the PCRF 525 may directly receive the security information response message (see operation 565) from the user equipment 505 and may omit operation 570.

In operation 575, the PCRF 525 may perform the decryption of the HTTPS traffic directly or through other network entities, on the basis of the received security information. The PCRF 525 may decode the HTTPS traffic to acquire the detailed contents (for example, characters, image data, and the like, included in the HTTPS traffic) of the HTTPS traffic. The PCRF 525 may use the security information (see operations 565 or 570) to directly decode the HTTPS traffic.

The PCRF 525 may also provide the security information to the specific entity within the network to perform a control to decrypt the HTTPS traffic. In this case, the PCRF 525 may select the entity for decrypting the HTTPS traffic. For example, the TDF, the PCEF, the AF, or the decryption-only entity may be used. When the decryption is performed in other entities, not the PCRF 525, the entity performing the decryption may provide the entirety of the detailed contents of the HTTPS traffic or summary information on the detailed contents of the HTTPS traffic according to the decryption result. If the decryption is performed in the AF 530 or the decryption-only entity, the PCRF may set the operation of the PDN-GW to redirect the HTTPS traffic to the AF 530 or the decryption-only entity.

The decryption operation may also be applied to the downlink HTTPS traffic transmitted from the server to the user equipment 505 as well as the uplink HTTPS traffic from the user equipment 505 to the server. When the same security information is used in the uplink HTTPS traffic and the downlink HTTPS traffic, the uplink HTTPS traffic may be decrypted by using the security information on the uplink HTTPS traffic received from the user equipment 505 or the server, or the downlink HTTPS traffic may be decrypted by using the security information on the downlink HTTPS traffic received from the user equipment 505 or the server.

In the HTTPS traffic, the uplink HTTPS traffic and the downlink HTTPS traffic use the same TLS connection and therefore use the same security information. However, when embodiments of the present disclosure acquire the security information and decrypt the HTTPS traffic, a case in which the TLS connection for the uplink HTTPS traffic and the downlink HTTPS traffic that may not be separated is included.

In the decryption of the existing HTTPS traffic in which the uplink HTTPS traffic and the downlink HTTPS traffic use the same security information, decrypting the uplink HTTPS traffic transmitted from the user equipment 505 using the security information provided from the server, or decrypting the downlink HTTPS traffic transmitted from the server using the security information provided from the user equipment 505, may also be problematic in the security rules under the agreement, the consent, or the setting between the operator and the user of the user equipment 505 or between the operator and the third server operator. To solve the problem, in accordance with an embodiment of the present disclosure, the TLS connection for the uplink HTTPS traffic and the downlink HTTPS traffic may be separately generated.

When the TLC connection is generated separately, the security information on the uplink HTTPS traffic and the security information on the downlink HTTPS traffic may be different from each other. For example, when the security information consists of the session key and the encryption algorithm of the TLS connection, if the TLS connection is separated, the uplink HTTPS traffic and the downlink HTTPS traffic may use different session keys and encryption algorithms. In this case, under the agreement, the consent, or the setting between the operator and the user of the user equipment 505 or between the operator and the third server operator, the PCRF may selectively collect the security information on the uplink HTTPS traffic and the downlink HTTPS traffic and selectively decrypt the uplink HTTPS traffic and the downlink HTTPS traffic.

Hereinafter, an embodiment of sharing the HTTP or the HTTPS traffic metadata will now be described.

Unlike the embodiment in which the network operator decrypts the HTTPS traffic to directly confirm the contents of the HTTPS traffic, in accordance with the present embodiment, the network operator may receive the HTTPS traffic metadata from the user equipment to indirectly confirm the information on the HTTPS traffic. The HTTPS traffic metadata are data describing the HTTPS traffic, and includes attribute information on the HTTPS traffic. The HTTPS traffic metadata may include the packet related information on the HTTPS traffic and/or the statistical information on the HTTPS traffic. For each packet included in the HTTPS traffic, the packet related information on the HTTPS traffic may include at least one of domain and/or IP address information on the server, an HTTP request method (Request, Put, Head, and the like) among the traffic request messages, HTTP response status line (200 OK, 404 Not Found, and the like) and HTTP response header content-type (text/html, image/jpg, application/JavaScript, and the like) information among the traffic response messages, and the like. The statistical information on the HTTPS traffic may include at least one of the domain and/or IP address information of the server to which the user equipment is connected, traffic holding time of the traffic connected to each server, a kind of traffic, the packet related information included in the traffic, and the like. The HTTPS traffic metadata are not limited to the packet related information on the HTTPS traffic and the statistical information on the HTTPS traffic, and may additionally include other types of information.

The generation target of the metadata is not limited to the HTTPS traffic, and the metadata may be identically generated even for the HTTP traffic that is not encrypted. Therefore, the embodiment corresponding to FIGS. 6 to 8 assumes the HTTPS traffic, but it is to be noted that the contents of the present disclosure may be applied in a similar manner to HTTP traffic as well as HTTPS traffic. Therefore, in embodiments of the present disclosure corresponding to FIGS. 6 to 8, 'traffic metadata' and 'HTTPS traffic metadata' may be used as alternative terms.

Figure 6:
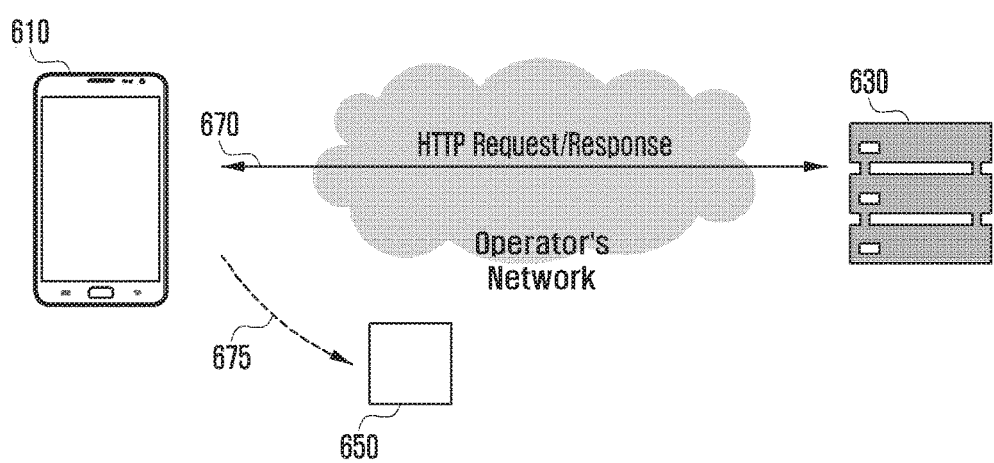
FIG. 6 is a diagram illustrating a method for providing a hypertext transfer protocol (HTTP) or HTTPS traffic metadata according to an embodiment of the present disclosure.

FIG. 6 is a diagram illustrating a method for providing, by a user equipment, HTTPS traffic metadata to a network operator according to an embodiment of the present disclosure.

Referring to FIG. 6, a system includes a user equipment 610, an operator's network entity 630, and a server 650. A method for providing HTTPS traffic metadata when the HTTPS traffic request and response are exchanged between the user equipment 610 and the server 630 will be described with reference to FIG. 6.

The server 630 is a server that is present outside the operator's network and may be a server that is connected to the HTTPS traffic by the user equipment 610. In accordance with an embodiment of the present disclosure, the operator's network entity 650 is an entity that receives the HTTPS traffic metadata from the user equipment 610. Further, the operator's network entity 650 may provide the HTTPS traffic metadata information to other operator's network entities and the operator may provide additional web services to the user based thereon.

In operation 670, the user equipment 610 transmits the HTTPS traffic request message for the server 630. Further, the user equipment may receive the HTTPS traffic response message from the server 630.

The user equipment 610 may be set in advance to transmit the HTTPS traffic metadata to the operator's network entity 650 according to the preset condition. The preset condition may be the case in which the user equipment transmits the HTTPS traffic request message or receives the HTTPS traffic response message. Further, the preset condition may be the case in which a specific period where the operator or the user may be arbitrarily set and changed, expires. Further, the preset condition may be the case in which the specific entity (for example, PCRF of the LTE system) within the operator's network requests the information on the HTTPS traffic from the user equipment periodically or aperiodically as needed.

When the preset condition described in operation 670 is generated, in operation 675, the user equipment 610 may generate a packet including the HTTPS traffic metadata and transmit the generated packet to the operator's network entity 650.

In addition, a method for generating, by a user equipment 610, HTTPS traffic metadata will now be described in detail.

The packet including the HTTPS traffic metadata may consist of an IP header and a payload. Therefore, as part of the generation of the HTTPS traffic metadata, a method for configuring an IP header will now be described.

The user equipment 610 may generate an identifier or identification for the HTTPS traffic corresponding to the HTTPS traffic metadata to be transmitted, to thereby configure the IP header. The identifier may be an identifier that is arbitrarily generated. When the form of the IP packet used in the operator's network is an IP version 4 (IPv4) type, the user equipment 610 may insert the identifier into a type of service field of the IPv4 header. When the form of the IP packet used in the operator's network is an IP version 6 (IPv6) type, the user equipment 610 may insert the identifier into a flow label field of the IPv6 header. By using the identifier, the user equipment 610 may instruct on which HTTPS traffic the HTTPS traffic metadata are relevant information.

For example, the identifier may start from 0 and may be increased by 1 when the HTTPS traffic session is newly generated, and identifiers between 0 and 255 may be allocated when considering the size of the type of service field of the IPv4 header or the flow label field of the IPv6 header. A unique identifier of the HTTPS traffic may be set so that the packets included in the corresponding HTTPS traffic and the packets transmitting the metadata share the same value. Using the identifier configuration within the IP header, the operator's network entity 650 receiving the HTTPS traffic metadata may confirm whether the packet information on the HTTPS traffic included in the HTTPS traffic metadata and/or the statistical information on the HTTPS traffic is used to represent the information on any HTTPS traffic.

Further, the user equipment 610 may generate the unique protocol identifier for the packet used to transmit the HTTPS traffic metadata to configure the IP header. When the IP header type is the IPv4, the user equipment 610 may insert the unique protocol identifier into a protocol field. When the IP header type is the IPv6, the user equipment 610 may insert the unique protocol identifier into a next header field. The protocol field of the IPv4 header and the next header field of the IPv6 header are originally selected on the basis of an internet assigned numbers authority (IANA) list (for example: TCP→0x06, UDP→0x11). Values of 0x8F~0xFC based on the IANA list are considered to be in a non-allocated state. Therefore, the user equipment 610 may select one value of 0x8F~0xFC and insert the selected value. That is, the user equipment 610 may insert a unique protocol ID used to transmit the HTTPS traffic metadata into the IP header. The user equipment 610 may then use the unique protocol ID to instruct whether the present packet is the packet for the transmission of the HTPPS traffic metadata.

The payload may include the HTTPS traffic packet related information or the HTTPS traffic statistical information.

In addition, a dummy TCP header or a dummy UDP header may be inserted into the payload. This is to minimize the function change of the corresponding operator's network entity since the operator's network entity (for example, TDF or PCEF of the LTE system) mainly used for the detection of the traffic in the operator's network, generally uses the TCP header or the UDP header to detect the traffic.

The packet for the transmission of the HTTPS traffic metadata received by the operator's network from the user equipment 610 includes the identifier indicating that the corresponding packet is the packet for the transmission of the metadata. For example, the identifier may be the unique protocol identifier. The specific entity (for example, PCEF or TDF of the LTE system) of the operator's network may use the unique protocol identifier to determine whether the packet received from the user equipment 610 is not the general packet, but the packet for the transmission of the HTTPS traffic metadata information. In this case, the operator's network entity does not transmit it to the Internet (for example, PDN in the LTE system) but may redirect it to the specific entity (for example, PCRF of the LTE system) for managing the HTTPS traffic metadata among the operator's network entity.

The operator's network entity for managing the HTTPS traffic metadata may use any identifier and/or an identifier for the HTTPS traffic included in the HTTPS traffic metadata packet to identify for which HTTPS traffic the HTTPS traffic metadata are metadata. The operator's network may use the acquired HTTPS traffic metadata to collect the information on the HTTPS traffic and may provide the collected information to the server of the third server operator, and so on if necessary. The server of the operator's network or the third server operator, and may provide an additional service (for example, user customized advertisement service and the like), to the user equipment 610 based on the information collected through the HTTPS traffic metadata.

Figure 7:
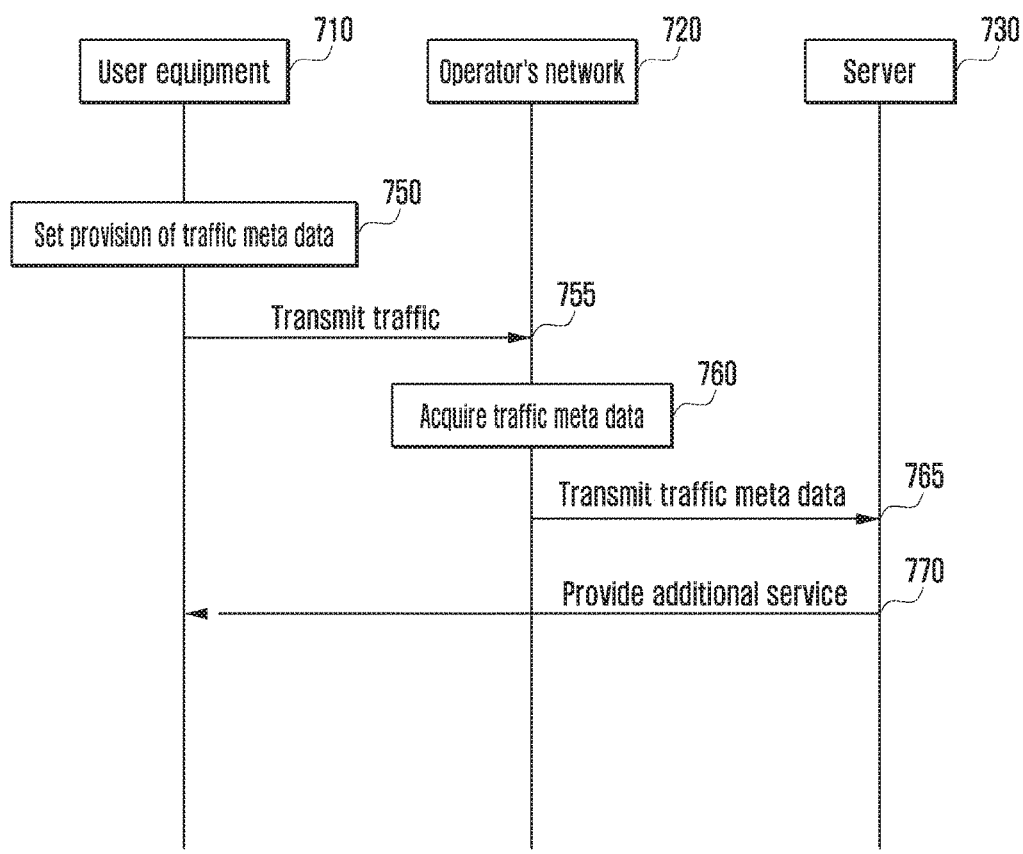
FIG. 7 is a diagram illustrating a method for providing web services according to an embodiment of the present disclosure.

FIG. 7 is a diagram illustrating a method for providing web services according to an embodiment of the present disclosure.

Referring to FIG. 7, a mobile communication system includes a user equipment 710, an operator's network entity 720, and a server 730. The server 730 may not be a server operated by the operator, but may be a third server.

In operation 750, the setting for the provision of the traffic metadata may be applied to the user equipment 710. The setting (for example, preconfigured information) for the provision of the traffic metadata may be applied in the production process of the user equipment. The setting for the provision of the traffic meta data may also be applied on the basis of the message exchange between the user equipment and the operator's network entity (for example, PCRF of the LTE system). The setting for the provision of the traffic metadata includes, but is not limited to, the basic setting of the user equipment for performing the embodiments of the present disclosure described with reference to FIGS. 1 to 6. The basic setting may include at least one one of a proxy information or proxy PAC or information for requesting proxy information or information for receiving proxy information.

In operation 755, the user equipment 710 may transmit the traffic through the operator's network 720. The traffic may be an HTTP or HTTPS traffic request message.

In operation 760, the operator's network 720 may acquire the traffic metadata. As a method for acquiring traffic metadata, the methods described with reference to FIGS. 1 to 6 may be used. That is, the operator's network 720 may allow the user equipment 710 to use the proxy operated by the operator's network to acquire the traffic metadata. Further, the operator's network 720 may acquire the security information on the user equipment 710 through any operator's network entity (for example, PCRF and PDN-GW of the LTE system) and decrypt the traffic transmitted from the user equipment using the acquired security information to directly acquire the traffic metadata. Further, the operator's network 720 may also receive the traffic metadata from the user equipment 710. The methods for acquiring traffic metadata are the same as those described with reference to FIGS. 1 to 6.

In operation 765, the operator's network 720 may transmit the traffic metadata or some of the traffic metadata to the server 730. The traffic metadata may be parsed to include the information describing the traffic transmitted and received by the user equipment 710.

In operation 770, the server 730 may provide an additional service to the user equipment 710. That is, the server 730 may provide the additional service corresponding to the traffic metadata based on the traffic metadata received from the operator's network 720. For example, the additional service may include the advertisement information corresponding to the traffic metadata.

Figure 8:
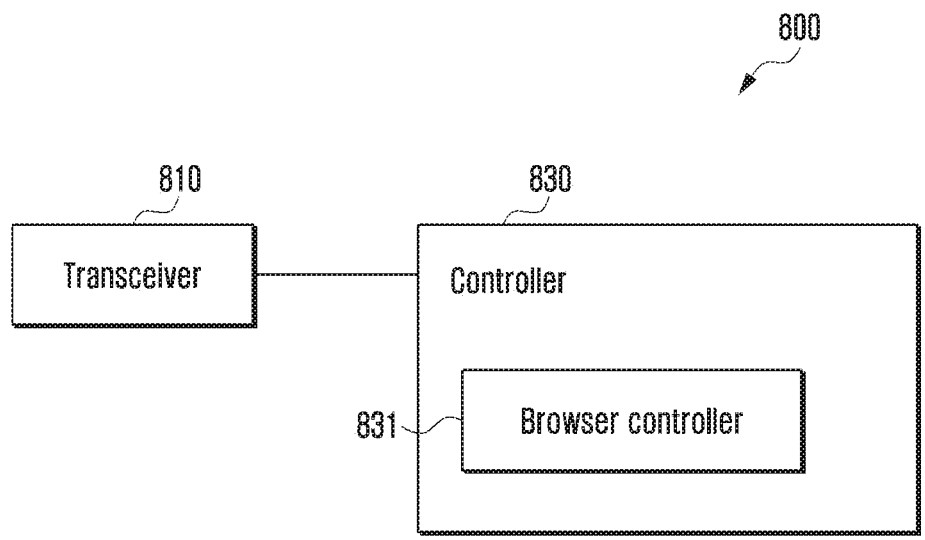
FIG. 8 is a block diagram illustrating a user equipment according to an embodiment of the present disclosure.

FIG. 8 is a block diagram illustrating a user equipment according to an embodiment of the present disclosure.

Referring to FIG. 8, a user equipment 800 includes a transceiver 810 for transmitting and receiving a signal and a controller 830 for controlling the overall operation of the user equipment 800. In accordance with an embodiment of the present disclosure, the controller 830 may further include a browser controller 831. The browser controller 831 may control the browser of the user equipment to transmit and receive the traffic (for example, HTTP or HTTPS traffic) to and from the user equipment as the operator's traffic. For example, a control range of the browser controller 831 may include an operation of setting the proxy to be used when the browser transmits and receives the HTTP or the HTTPS traffic.

In accordance with the embodiment of the present disclosure, the controller 830 may perform a control to request the operator proxy information from the operator's network, receive the operator proxy information from the operator's network, set the browser's proxy through the browser controller 831 of the user equipment based on the operator proxy information, and pass the traffic transmitted and received by the browser through the set operator proxy.

Further, the controller 830 may control the user equipment 800 to request the operator proxy information to find out the operator proxy upon the driving of the browser, a first access of the user equipment to the network, or a new PDN access. The operator proxy information may include location information on at least one operator proxy represented in a form of an IP address, a URL, and the like, or location information on at least one proxy PAC file represented in the form of the IP address, the URL, and the like.

Further, the controller 830 may control the user equipment 800 to transmit the traffic request message, receive the traffic response message, collect the traffic metadata for at least one of the traffic request message and the traffic response message, generate the packet including the collected traffic metadata, and transmit the packet including the generated metadata to the operator's network.

In this case, the packet including the traffic metadata may include the identifier information corresponding to the traffic request message or the traffic response message, the traffic metadata corresponding to the traffic request message or the traffic response message, and the identifier information corresponding to the packet including the traffic metadata.

Further, the controller 830 may control the user equipment 800 to receive the message requesting the security information on the HTTPS traffic from the operator's network and transmit the security information to the operator's network corresponding to the received message. The security information may include the session key information and the encryption algorithm information of the TLS connection. The security information may be used to allow the operator's network entity to decrypt the HTTPS traffic transmitted and received by the user equipment 800 in the operator network.

In accordance with an embodiment of the present disclosure, the configuration of the user equipment 800 is not limited to that illustrated in FIG. 8. Further, the operation of the user equipment 800 and the controller 830 is not limited to that described in regard to FIG. 8. The controller 830 may perform the operation of the user equipment in accordance with the embodiments of the present disclosure described with reference to FIGS. 1 to 7.

Figure 9:
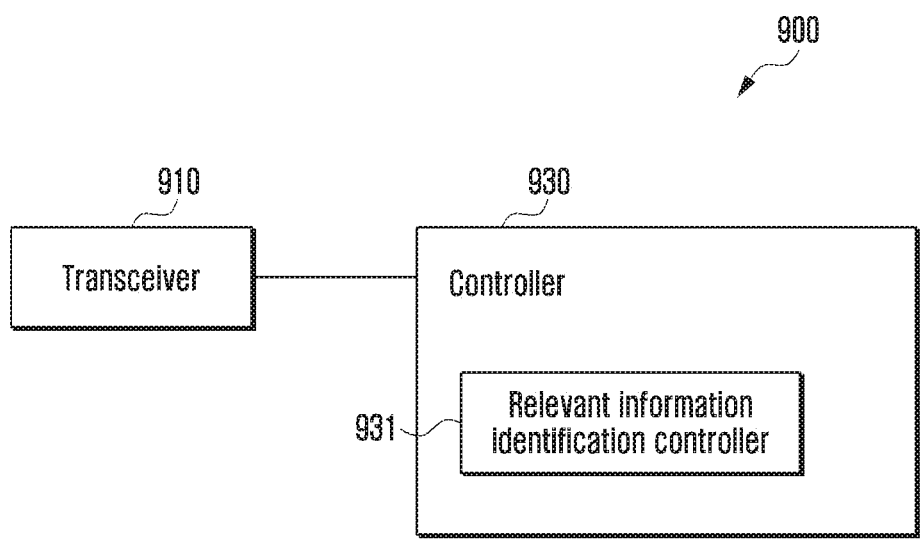
FIG. 9 is a block diagram illustrating an operator's network entity according to an embodiment of the present disclosure.

FIG. 9 is a block diagram illustrating an operator's network entity according to an embodiment of the present disclosure.

Referring to FIG. 9, an operator's network entity 900 includes a transceiver 910 for transmitting and receiving a signal and a controller 930 for controlling the overall operation of the user equipment 900. In accordance with the embodiment of the present disclosure, the controller 930 may further include a traffic metadata identification controller 931. The traffic metadata identification controller 931 may receive a message including the traffic metadata transmitted by the user equipment to identify the traffic metadata included in the corresponding message. The operator's network entity 900 may be, for example, the PCRF of the LTE system or may be a separate entity within the operator's network for supporting the embodiment of the present disclosure.

In accordance with an embodiment of the present disclosure, the controller 930 may control the operator's network entity 900 to receive the message requesting the operator proxy information from the user equipment, determine the operator proxy to be used by the user equipment based on the message, and transmit the operator proxy information to the user equipment based on the determination. In this case, the operator proxy information may be transmitted to the browser controller of the user equipment and thus, the browser controller may use the operator proxy information to pass the traffic using the specific browser among the traffic transmitted and received by the user equipment through the operator proxy.

Further, the controller 930 may control the operator network entity 900 to determine the operator proxy based on the PLMN identification information and/or the APN and/or the location information of the user equipment, and transmit the operator proxy information to the user equipment based on the determination. The operator proxy information may include location information on at least one operator proxy represented in a form of an IP address, a URL, and the like, or location information on at least one proxy PAC file represented in the form of the IP address, the URL, and the like.

Further, the controller 930 may control the operator network entity 900 to detect or receive the HTTPS traffic transmitted and received by the user equipment regardless of whether using the operator proxy, decrypt the HTTPS traffic based on the security information transmitted from the user equipment or the third server, and provide the traffic metadata for the decrypted HTTPS traffic to other servers.

Further, the controller 930 may control the operator network entity 900 to process the traffic request message or the traffic response message of the user equipment through the operator network, receive any packet from the user equipment, determine whether the received packet is the packet included in the general traffic or the packet including the traffic metadata, and process the packet based on the determination on the message type.

Further, the controller 930 may transmit the packet to the PDN when the packet is the packet included in the general traffic. Further, the controller 930 may perform a control to identify the traffic metadata and transmit the identified metadata to other third servers, when the packet is the packet including the traffic metadata.

In this case, the packet including the traffic metadata may include the identifier information corresponding to the traffic request message or the traffic response message, the traffic metadata corresponding to the traffic request message or the traffic response message, and the identifier information corresponding to the packet including the traffic metadata.

Further, the controller 930 may control the operator network entity 900 to request the security information on the HTTPS traffic from the user equipment. The security information may include the session key information and the encryption algorithm information of the TLS connection. The controller 930 may control the operator network entity 900 to use the security information received from the user equipment to decrypt the HTTPS traffic. Further, the controller 930 may perform a control to analyze the decrypted HTTPS traffic to provide the acquired HTTPS traffic metadata and the information on the user equipment to other servers.

In accordance with an embodiment of the present disclosure, the configuration of the operator network entity 900 is not limited to that illustrated in FIG. 9. Further, the operation of the operator network entity 900 and the controller 930 is not limited to that described in regard to FIG. 9. The controller 930 may perform the operation of the operator network entity 900 in accordance with embodiments of the present disclosure described with reference to FIGS. 1 to 7.

In accordance with various embodiments of the present disclosure, an improved method and apparatus for providing web services can be provided.

Further, in accordance with various embodiments of the present disclosure, an operator can directly or indirectly operate the proxy and may inspect and control the HTTPS traffic.

In accordance with various embodiments of the present disclosure, for the HTTPS traffic without passing through the operator proxy, a user equipment can share security TLS connection information or summary/statistical information with a PLMN to allow the PLMN to collect HTTPS traffic relevant information.

Further, the web services can be provided by using the inspection result of the HTTPS traffic and the collected HTTPS traffic relevant information.

According to various embodiments of the present disclosure, at least part of a device (for example, modules or functions thereof) or a method (for example, operations) according to this disclosure, for example, as in a form of a programming module, may be implemented using an instruction stored in non-transitory computer-readable storage media. When at least one processor (for example, the controller 831 and 931) executes an instruction, it may perform a function corresponding to the instruction.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a compiler. The hardware device may be configured to operate as at least one software module to perform an operation of various embodiments and vice versa.

A module or programming module according to various embodiments of the present disclosure may include at least one of the above-mentioned components, may not include some of the above-mentioned components, or may further include another component. Operations performed by a module, programming module, or other components according to various embodiments of the present disclosure may be executed through a sequential, parallel, repetitive or heuristic method. Additionally, some operations may be executed in a different order or may be omitted, and other operations may be added. Moreover, the embodiments disclosed in this specification are suggested for the description and understanding of technical content, but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of a user equipment, the method comprising:
transmitting a proxy information request message including public land mobile network (PLMN) information and access point name to a network entity, wherein the proxy information request message is related to a browser of the user equipment;
receiving proxy information related to the browser of the user equipment from the network entity for obtaining metadata related to a traffic requested from the browser;
setting a proxy to be used by the browser based on the proxy information; and
transmitting the traffic requested from the browser through the set proxy.

2. The method of claim 1,
wherein the received proxy information is used to set the proxy for the browser and transfer the metadata related to the traffic from the set proxy server to the network entity.

3. The method of claim 1, further comprising:
identifying the proxy information from a preconfigured information.

4. The method of claim 1, wherein an operation for transmitting the proxy information request message is triggered based on one of upon driving of the browser, a network connection of the user equipment, a new packet data network (PDN) access of the user equipment, or a profile install or use of the user equipment.

5. The method of claim 1, wherein the proxy information includes at least one of location information of at least one proxy represented by a form of an internet protocol (IP) address or a uniform resource locator (URL), or location information of at least one proxy auto configuration (PAC) file represented by the form of the IP address or the URL.

6. A user equipment, the user equipment comprising:
a transceiver configured to transmit and receive a signal; and a controller configured to:
  transmit a proxy information request message including public land mobile network (PLMN) information and access point name to a network entity, wherein the proxy information request message is related to a browser of the user equipment,
  receive proxy information related to the browser of the user equipment from the network entity for obtaining metadata related to a traffic requested from the browser,
  set a proxy to be used by the browser based on the proxy information, and
  transmit the traffic requested from the browser through the set proxy.

7. The user equipment of claim 6,
wherein the received proxy information is used to set the proxy for the browser and transfer the metadata related to the traffic from the set proxy server to the network entity.

8. The user equipment of claim 6, wherein the controller is further configured to identify the proxy information from a preconfigured information.

9. The user equipment of claim 6, wherein an operation for transmitting the proxy information request message is triggered based on one of upon driving of the browser, a network connection of the user equipment, a new packet data network (PDN) access of the user equipment, or a profile install or use of the user equipment.

10. The user equipment of claim 6, wherein the proxy information includes at least one of location information of at least one proxy represented by a form of an internet protocol (IP) address or a uniform resource locator (URL), or location information of at least one proxy auto configuration (PAC) file represented by the form of the IP address or the URL.

11. A method for operating a network entity, the method comprising:
  receiving a proxy information request message including public land mobile network (PLMN) information and access point name to a network entity, wherein the proxy information request message is related to a browser of a user equipment;
  determining a proxy to be used by the browser of the user equipment based on the proxy information request message;
  transmitting proxy information for the determined proxy to the user equipment; and
  obtaining, from the proxy, metadata related to a traffic that is requested from the browser of the user equipment.

12. The method of claim 11, wherein the proxy is determined based on at least one of the PLMN information and the access point name (APN).

13. The method of claim 11, wherein the proxy information includes at least one of location information of at least one proxy represented by a form of an IP address or a uniform resource locator (URL), or location information of at least one proxy auto configuration (PAC) file represented by the form of the internet protocol (IP) address or the URL.

14. A network entity, the network entity comprising:
  a transceiver configured to transmit and receive a signal; and
  a controller configured to:
    receive a proxy information request message including public land mobile network (PLMN) information and access point name to a network entity, wherein the proxy information request message is related to a browser of a user equipment,
    determine a proxy to be used by the browser of the user equipment based on the proxy information request message,
    transmit proxy information for the determined proxy to the user equipment, and
    obtain, from the proxy, metadata related to a traffic that is requested from the browser of the user equipment.

15. The network entity of claim 14, wherein the controller is further configured to determine the proxy based on the PLMN information and the access point name (APN).

16. The network entity of claim 14, wherein the proxy information includes at least one of location information of at least one proxy represented by a form of an internet protocol (IP) address or a uniform resource locator (URL), and location information of at least one proxy auto configuration (PAC) file represented by the form of the IP address or the URL.

17. The network entity of claim 14, wherein the controller is further configured to allow the proxy:
  to receive the traffic from the user equipment,
  to decrypt the received traffic,
  to generate traffic metadata using the decrypted traffic,
  to transmit the traffic metadata to an operator's network entity, and
  to provide the traffic metadata to another server.

18. A non-transitory computer readable recording medium for storing data relating to computing operations, the computer readable recording medium configured to store at least one instruction that when executed by a processor, configures the processor to:
  transmit a proxy information request message including public land mobile network (PLMN) information and access point name to a network entity, wherein the proxy information request message is related to a browser of the user equipment;
  receive proxy information related to the browser of the user equipment from the network entity for obtaining metadata related to a traffic requested from the browser;
  set a proxy to be used by the browser based on the proxy information; and
  transmit the traffic requested from the browser through the set proxy.

19. A non-transitory computer readable recording medium for storing data relating to computing operations, the computer readable recording medium configured to store at least one instruction that when executed by a processor, configures the processor to:
  receive a proxy information request message including public land mobile network (PLMN) information and access point name to a network entity, wherein the proxy information request message is related to a browser of a user equipment;
  determine a proxy to be used by the browser of the user equipment based on the proxy information request message; and
  transmit proxy information for the determined proxy to the user equipment, and
  obtain, from the proxy, metadata related to a traffic that is requested from the browser of the user equipment.

* * * * *